July 7, 1970   R. SCHMIDT   3,518,975
ROTARY-PISTON ENGINE
Filed May 1, 1968   4 Sheets-Sheet 1
Fig.1
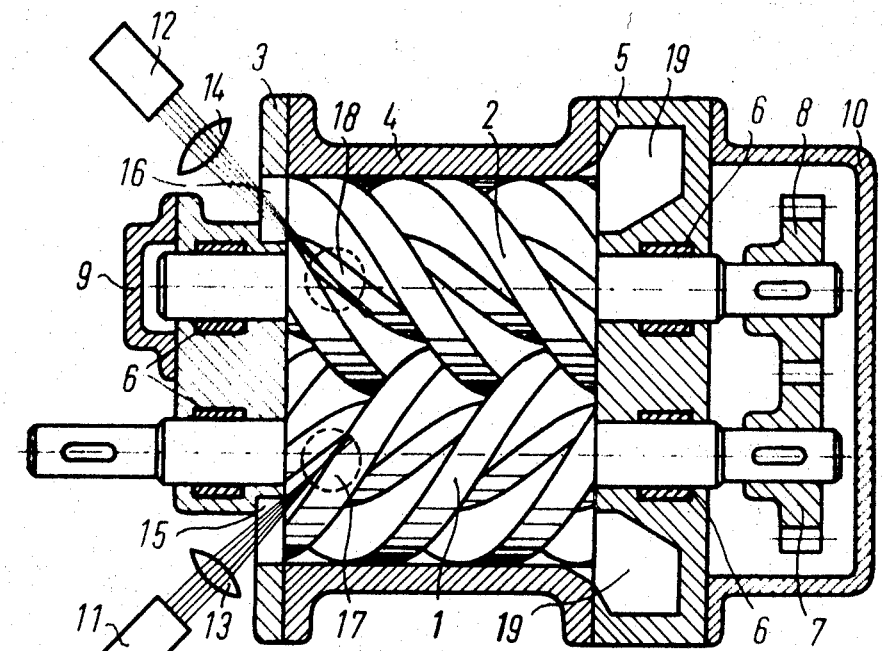
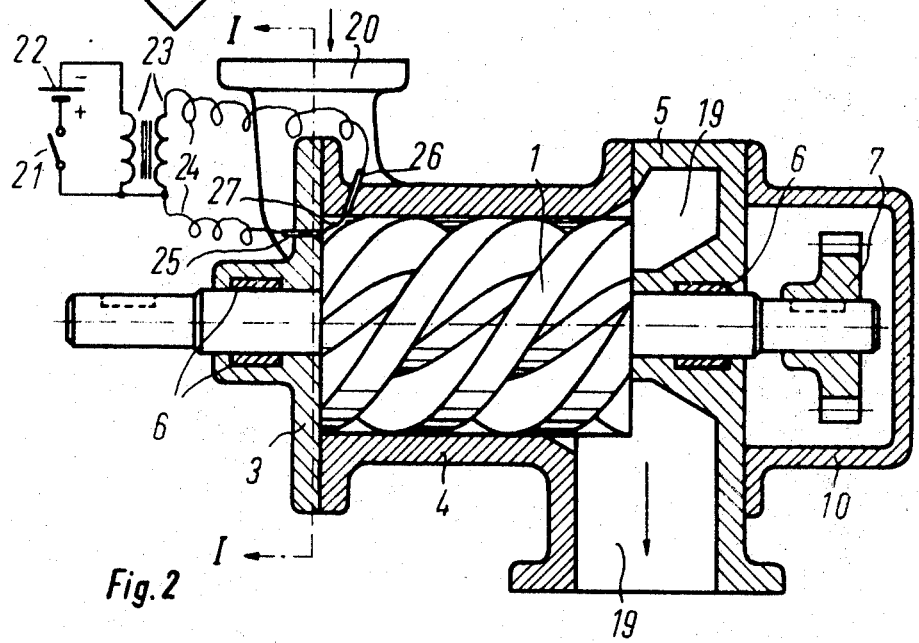
Fig.2

July 7, 1970  R. SCHMIDT  3,518,975
ROTARY-PISTON ENGINE
Filed May 1, 1968  4 Sheets-Sheet 2

July 7, 1970 R. SCHMIDT 3,518,975
ROTARY-PISTON ENGINE
Filed May 1, 1968 4 Sheets-Sheet 3

United States Patent Office 3,518,975
Patented July 7, 1970

1

3,518,975
ROTARY-PISTON ENGINE
Reinhold Schmidt, 20 Friedrich-Bauer-Str.,
8520 Erlangen, Germany
Filed May 1, 1968, Ser. No. 725,705
Claims priority, application Germany, May 9, 1967,
Sch 40,675
Int. Cl. F01c *17/02, 21/16;* F02b *53/10*
U.S. Cl. 123—8.49                                    12 Claims

ABSTRACT OF THE DISCLOSURE

A rotary-piston engine of the screw type exhibiting improved uniformity of thermal expansion. Ignition and combustion take place directly in the variable displacement chambers formed between the Lysholm-type screw turns of the intermeshing pistons and the inner jacket walls of the engine housing. This provides periodic pauses for the thermally highly stressed machine parts. By controlled fuel supply an isothermal combustion during expansion can be secured thus closely approaching the thermodynamically advantageous Ericsson process.

---

My invention relates to rotary-piston engines of the screw type.

Such engines comprise a housing whose inner perimetric or jacket surface has the shape of several cylinders whose respective cross sections are circular and overlap each other, the housing being closed by respective covers at the two axial ends. Coaxially mounted in the cylindrical spaces of the housing are the rotary pistons of which each constitutes a screw or helix in meshing engagement with the adjacent piston. Conjointly with the housing, the pistons form variable displacement chambers during conjoint rotation of the pistons.

In known engines of this type the displacement chambers are in communication with a space that contains an ignition device. Also known, according to German Pat. 478,965, are rotary-piston engines in which two rotors of the spur-gear type, provided with slanting or angular teeth, are in meshing engagement with each other. A combustible mixture is pressed into a compressor chamber where it is ignited whereafter it expands into a portion of the engine in order to perform utilizable work. Such machines have not gained practical significance.

Rotary-piston machines with screw-type rotors similar to those of the type Lysholm are described in German Pat. 858,448 as gas power engines operating on a combustion process similar to a constant-pressure gas turbine. For good efficiency the operation must be at high combustion temperatures on the inlet side of such an engine. However, the materials presently available, taking into account the slight running clearance required for this type of engine, do not permit a continuous performance at sufficiently high temperatures to secure satisfactory efficiency.

It is known from practical experience, that aside from other influences, such as the working pressure, the distortion of the rotors and the housings due to thermal tensions is the main cause of the impairment to the reliable functioning of this general type of machinery. Particularly the temperature drop originating from the adiabatic or polytropic expansion of the working medium in all of these machines can be coped with only within stringent limits.

2

It is an object of my invention to afford an operation of this general type of rotary-piston machines, namely those that form variable displacement chambers due to rotation of the pistons, in such a manner that non-uniform temperature distribution in the active engine parts and consequently non-uniform running clearances or a non-uniform performance is prevented.

To this end, and in accordance with a feature of my invention, the displacement chambers which increases after initiation of a rotary piston movement are in communication, simultaneously or sequentially, with the inlets for gaseous working medium such as air and the inlet for the controlled supply of fuel; and thereafter the displacement chambers are directly in communication with the ignition devices which, when the displacement chambers are shut off from the working-medium inlet, act through parts of the engine housing to ignite the fuel; and ultimately the same displacement chambers are connected with the exhaust openings of the engine. In conjunction with this particular cycle of communicating connections of the displacement chambers, an engine according to the invention has at least one of its rotary pistons, seen in cross section, so shaped that its lobes have a convex profile located predominantly outside of the pitch circle, whereas at least one of the other rotary pistons, seen in cross section, has lobes of concave profile located predominantly within the pitch circle.

It will be recognized that an engine according to the invention operates on a three-cycle process in which the working medium (air) is inducted by the displacement chambers as these chambers are increasing (first cycle). Then the supplied fuel is pulsatingly ignited and combusted (second cycle). The ensuing expansion has the effect of driving the engine, whereafter the rotating piston ejects the working medium and the combustion products (third cycle).

The advantageous qualities of the screw piston machines (such as the self-cleaning effect, ability of ingesting incompressible media, and simple mechanical design similar to a turbo engine) are thus combined with the advantages of the pulsating motoric driving process of internal combustion engines. This is fundamentally due to the fact that by virtue of the invention the thermally highly stressed machine components, such as the rotors and the housing, are given intermittent pauses during which a uniform temperature distribution can adjust itself between these components, thus securing a preservation of the essential clearances.

It is particularly advantageous to equip the ignition device of the engine with laser radiators so that the fuel will commence combusting on all sides from the center of the displacement chambers and will advance along an ignition line or ignition area. Another advantage is the fact that the fuel can be supplied by suction and/or blowing and/or injection. Due to the high absorption of the laser radiation, coal dust or a coal-water emulsion is well suitable as a fuel, although hydrogen having a very high combustion rate can also be utilized. Another way of ignition is to provide an electric spark gap preferably directly in the space traversed by the helical rotary piston.

It is rather simple to provide for internal cooling to be effective before, during or after ignition. For this purpose, the displacement chambers may be connected to pipelines which supply a coolant. Cooling liquid thus supplied may also serve as a sealing liquid.

It is further preferable to connect a compressor to the air inlet of the rotary-piston engine in order to increase the engine efficiency. A constructive simplification is achieved by using as such as compressor, another machine of the screw type and combining it with the rotary-piston engine according to the invention to a single machinery unit having one or more rotor shafts in common.

According to another feature of the invention, a rotary-piston engine according to the invention is designed as a machine set which comprises a plurality of compressors which may operate in known manner as expansion stages and are arranged on several shafts or have a single shaft in common. In this manner, portions of the machinery set become individually operable as motors.

In order to counterbalance axial thrust, such machinery sets may be equipped with screw-type pistons which have sections of mutually opposed pitch, resembling in this respect an arrow-type spur gear with a herring-bone profile. The engine housing in such case is provided with openings communicating with the displacement chambers formed in the respective sections of the rotors and through which the working medium is supplied to the engine or discharged therefrom.

Particularly when employing the rotary-piston engine as part of a machine set which comprises several expansion stages, the use of internal cooling with the aid of liquid coolants results in the formation of gas-vapor mixtures, for example a mixture of combustion air and steam. According to a further feature of my invention, the shares of the gas-vapor mixture are varied as to quantity in dependence upon pressure and/or the temperature on the inlet side and/or temperature at the outlet side of an expansion stage which is connected to the exhaust of the engine. In this manner, the steam or vapor components can be condensed and the resulting condensate liquid improves the sealing and the heat of condensation then liberated increases the working capacity of the remaining gas.

According to a further feature of the invention, the Ericsson process, desirable for gas turbines, can be more closely approached than with the methods heretofore employed. An isothermal heating of the engine can be attained by the choice of the fuel, i.e. by taking into account its reaction rate, by controlling the heat supply, by selecting the type and/or quantity of the fuel entirely or partially in accordance with the mathematical function for the isotherm, as well as by the chosen arrangement, number and size of the individual inlet or injection openings. Such isothermal heating of the engine involves not only the limit case of having the same temperature in all individual parts of the engine, but also includes a temperature distribution or temperature gradient at which the rotating pistons and the housing components are subjected to only such thermal expansion as will not endanger the uniformity or preservation of the clearances.

With the aid of temperature sensors for the active engine components there can be achieved not only an observation of the temperature but also the prerequisite for a correct adjustment of the injection operation for the automatic control or regulation of such operation.

The screw-type rotary engine, particularly of the type Lysholm, being inherently a hybrid of piston engine and turbo engine, possesses advantageous qualities of both. The operation of an engine according to my invention, especially if heat exchangers are also employed, adds further advantages such as the Ericsson process, and new qualities such as the isothermal combustion.

The invention will be further explained with reference to the accompanying drawings in which:

FIG. 1 is a horizontal section through a rotary piston engine according to the invention with a simplified representation of the screw rotors and the laser ignition device;

FIG. 2 is a vertical and longitudinal section through the main rotor, shown simplified, of the same engine as shown in FIG. 1 but in conjunction with a spark-gap ignition device;

Figure 4:
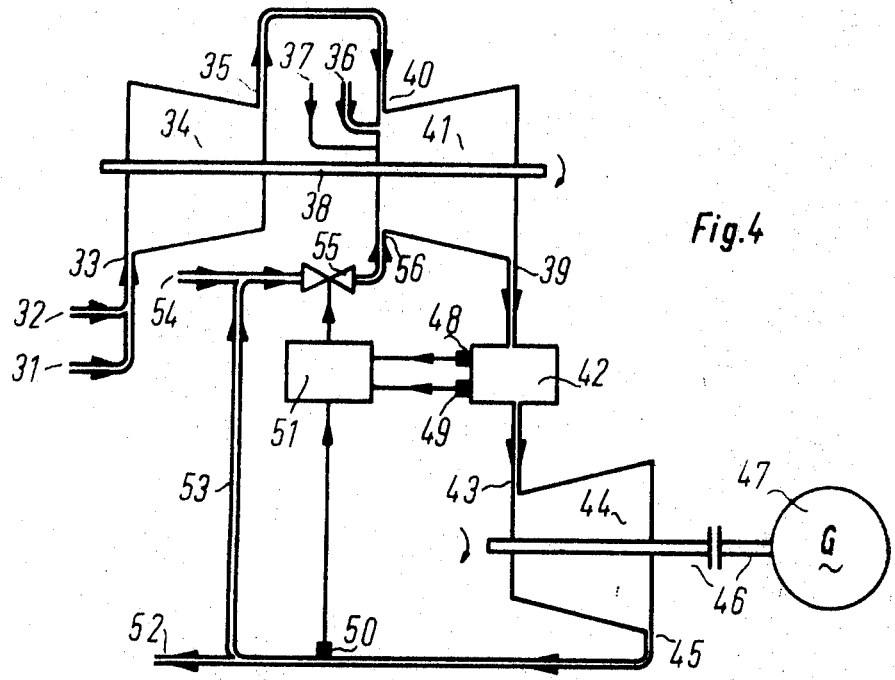
Figure 5:
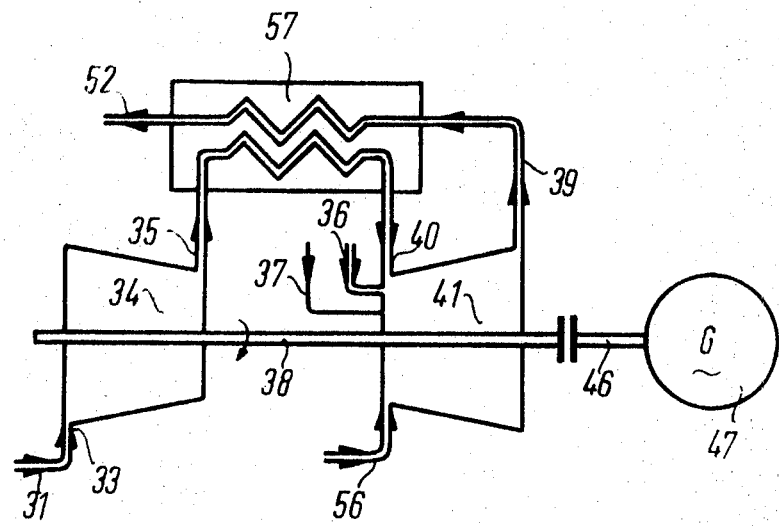
Figure 6:
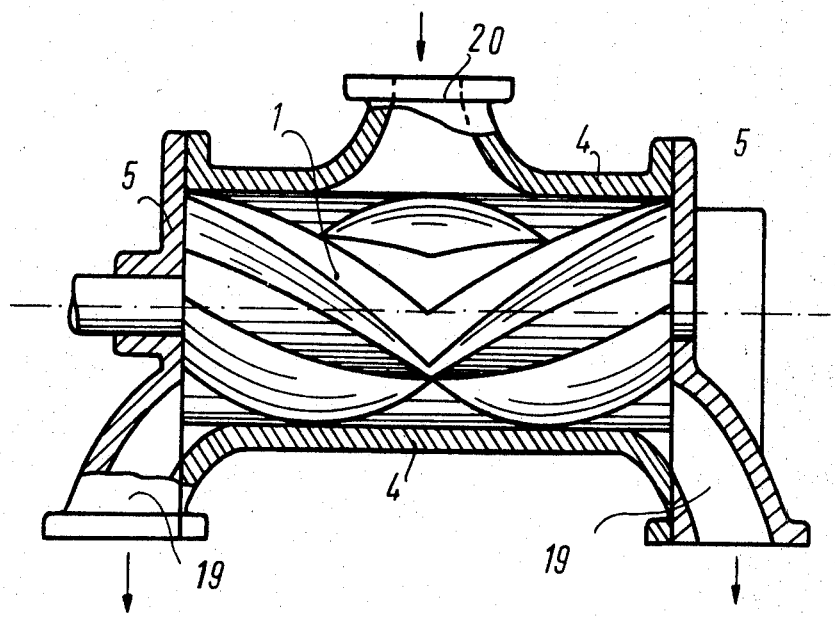

FIG. 4 is a block diagram of a two-shaft machine set of a rotary-piston engine and a compressor, together with appertaining control devices; and FIG. 5 is a block diagram of a single-shaft machine set according to the invention including a heat exchanger with single-stage heated expansion; and FIG. 6 is a vertical and longitudinal section through a rotary piston engine of the herring-bone profiled type.

The engine shown in FIG. 1 comprises two rotors 1 and 2 of the screw type in meshing engagement with each other. Each of the two rotors, seen in cross section, has three lobes. However, the illustration of these lobes in FIGS. 1 and 2 is schematic only. The correct lobe shape is apparent from FIG. 3. It will be seen that in this particular example one rotor has four lobes of a convex cross-sectional shape which roughly approaches that of a circular arc and is predominantly located outside of the pitch circle of the rotor. In contrast thereto, the other rotor has six lobes of concave shape whose areas are predominantly located inside of the pitch circle.

Reverting to FIGS. 1 and 2, the shafts of the two rotors are journalled in the axial end structures 3 and 5 of the engine housing with the aid of respective bearings 6. The rotors 1 and 2 are enclosed by the perimetric or jacket portion 4 of the housing whose internal surface has the shape of two cylinders which, seen in cross section, overlap each other. The rotor shafts are geared to each other by spur gears 7 and 8 which take care of rotating the rotors in a fixed ratio to each other so that the rotors will not drive or touch each other. Protective hoods 9 and 10 are mounted on the axial end plates 3 and 5 respectively. The end plate 3 is provided with window structures 15 and 16 of a material permeable to the radiation from laser radiators 11 and 12, respectively. The radiation is focused by lenses 13 and 14 at localities within the displacement chambers formed between the rotors 1 and 2 on the one hand, and the axial end plate 3 and the housing 4 on the other hand. The ignition of fuel contained in the displacement chambers commences from the focal points 17 and 18 respectively.

FIG. 2 shows an example of ignition by an electrical spark gap. An interrupter contact 21 is controlled by rotation of one of the rotors 1, 2. The ignition circuit comprises a voltage source 22, an ignition coil 23 and leads 24 which connect the coil with two spark-gap electrodes 25 and 26. Closing of the contact 21 causes a high voltage between the electrodes 25 and 26 to ignite an arc 27. Also applicable for ignition are conventional spark plugs or devices which cause a chemical reaction by injection. Laser ignition is suitable particularly for large engines because it facilitates starting the combustion in the center of each displacement chamber.

During rotation of the two rotors each displacement chamber increases its volume as it is being shut off from the duct 20. The enclosed gas mixture is then ignited. Ultimately the displacement chamber enters into communication with an exhaust opening 19.

If, in lieu of the spark-gap ignition by means of electrodes 25 and 26, commercial spark plugs are used, these may be mounted either on the plate 3 and/or on the wall of the housing 4.

Figure 3:
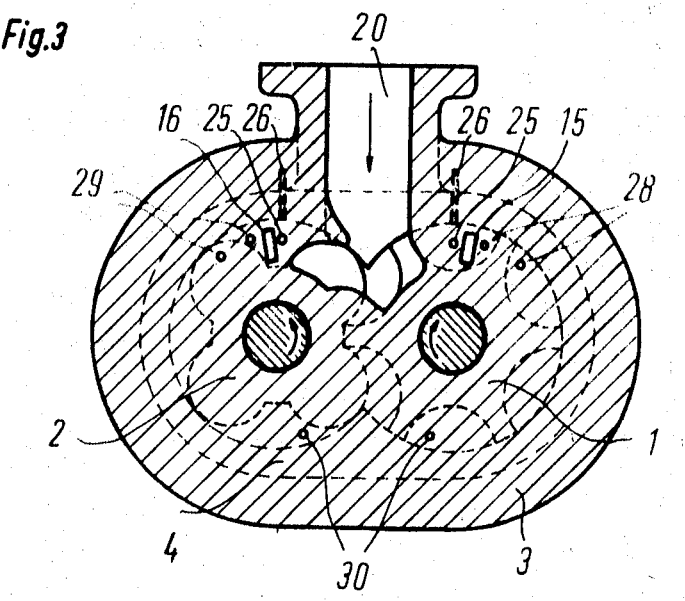
FIG. 3 is a vertical section along the line I—I in FIG. 2 except that it shows more accurately the Lysholm-type profile of the rotor, together with the ignition devices for use with lasers or selectively for electrical ignition.

The cross section shown in FIG. 3 indicates the inlet opening 20 and its communication with the adjacent displacement chamber formed between the rotors and the housing 4. The electrodes 26 and the openings for the electrodes 25 are visible, as well as the openings 28 and 29 for injection or pressure-supply of the fuel. The windows 15 and 16 permit the laser radiation to pass into the displacement chambers. The openings 30 are connected to the supply lines for the coolant to be used for internally cooling the engine.

The engine operates as follows: The fuel and the working medium (air), which may be pre-compressed, enter through the inlet duct 20 (FIGS. 2, 3). The mixture fills the displacement chamber then open to the duct 20. After initiating the rotary motion in the direction indicated in FIG. 3, the displacement chambers are sequentially shut off from the inlet duct 20. Only then is the ignition effected preferably by the laser radiators 11, 12 or by the arc between the electrodes 25 and 26. It is a particular advantage of the engine according to the invention that the displacement chambers, by passing along the ignition points, generate an ignition line or ignition area and thus improve the reliability of the ignition operation. By additionally moving the laser beam in the radial direction of the rotors, this effect can be further augmented. The progress of the combustion is controllable by controlling the flow of fuel through the openings 28 and 29 (FIG. 3). The further rotation of the rotors 1 and 2 causes the heated working medium to expand until the coolant, for example a liquid, is supplied through the openings 30. This liquid simultaneously also serves as a sealant. In this manner, a three-cycle process is achieved having the stages: induction, combustion and expansion, followed by exhausting or ejection of the combustion gases.

The electrodes 25, the windows for the laser radiation 15 and 16, the connections for the fuel supply 28 and 29 as well as for the supply of coolant 30 need not necessarily be located at or in the axial end plate 3 as shown in FIG. 3. They may also be located in the jacket portion of the housing 4 and may be coordinated to one or several of the displacement chambers. The fuel supply, and consequently the combustion process, can thus be controlled by correspondingly dimensioning and arranging the openings 28 and 29. Applicable for this purpose are continuous as well as pulsating injection devices. Laser ignition devices 11 and 12 afford particularly the ignition of coal dust or coal-water emulsions.

The high permissible speeds of rotation of the rotors 1 and 2, made possible by the simple mechanical design, also permit the use of hydrogen as fuel, thus utilizing its advantage of a high combustion rate and clean, non-poisonous combustion products.

The block diagram according to FIG. 4 relates to a two shaft machine set in which a screw engine 41 and a compressor 34 have a shaft 38 in common. The set also comprises an expansion engine 44 whose shaft 46 serves to drive an electric generator 47. The gaseous working medium is supplied through lines 31 and the fuel through a line 32 into the inlet duct 33 of the compressor 34. Upon compression, the mixture passes through the outlet duct 35 of the compressor into the inlet duct 40 of the rotary-piston engine 41 which drives the compressor 34. An ignition device 37 and/or the fuel supply 36 serve to initiate a combustion process in which the working capacity of the combustion gases is first used for driving the compressor 34 and then for charging an accumulator 42 through the outlet duct 39 of the engine 41. The accumulator 42 is connected to the inlet duct 43 of the expansion engine 44. The working medium leaves the engine 44 through the outlet and issues through a line 52 into the ambient air.

The rotary piston engine 41 which according to the invention is pulsatingly ignited, is internally cooled by coolant 54 supplied through line 56 and controlled by a hydraulic control apparatus 55. A sensor 48 responsive to pressure and a sensor 49 responsive to the temperature of the working medium in the accumulator 42, further a sensor 50 responsive to the temperature of the working medium issuing from the expansion engine 44, control the electrical and/or mechanical device 51 for the hydraulic control apparatus 55, so that the coolant, returning in line 53, is recycled after being condensed in the expansion engine 44.

A machine set of the type shown in FIG. 4 does not necessarily require the use of two shafts but can also be given a single-shaft design. This affords a better utilization of the working capacity of the gaseous working medium. While the set 34–41 operates at optimal speed and efficiency, the expansion engine 44 can be designed for the special driving requirements of a machine tool or electrical generator 47, or may also be made speed regulatable by providing for control means ahead of the inlet duct 43. The machine set 34–41 can be compensated for axial thrust by virtue of the single shaft 38 and by providing a mutually opposed arrangement of the high-pressure openings 35 and 40. For obtaining a similar compensation, the expansion engine 44 is preferably provided with an arrow-shaped respectively herring-bone profiled cross section of its helical lobes. The construction of such herring-bone profiled screw rotors is known according to the British Pat. No. 627,162 and shown with its principal features in FIG. 6 of this application. For elements with the same function the corresponding references from FIGS. 1 and 2 were used.

The expansion of the working medium through the rotary-piston engine 44 is preferably carried out down to low temperatures. To achieve this under all operating conditions, the hydraulic control 55 is made subject to control by the control device 51 with the aid of the measuring sensor 48 responsive to pressure, the sensor 49 responsive to the temperature at the inlet opening of the second expansion stage, and by the sensor 50 at the outlet side 45. In this manner, the coolant in lines 54 and/or 53 becomes repeatedly applicable. Due to the expansion of the gas-vapor mixture, caused by the internal cooling of the rotary-piston engine 41 which according to the invention is pulsatingly ignited, there is generated a sealant liquid in the second expansion stage 44. Furthermore, the liberated heat of condensation increases the working capacity of the remaining gas.

When supplying the coolant in dependence upon the quantity of fuel, a similar but simplified manner of operation is also possible.

FIG. 5 is the block diagram of a single-shaft machine set. The compressor 34, which need not necessarily be of the rotary-piston type, and the rotary-piston engine which according to the invention is pulsatingly ignited, have in common a single rotor shaft 38 which drives the shaft 46 of an electric generator 47.

The gaseous working medium, preferably air, to which coolant or sealant liquid may be admixed, passes through the line 31 into the inlet opening 33 of the compressor 34 and thence from the outlet opening 35 into a heat exchanger 57. From the exchanger the heated working medium passes through the inlet opening 40 into the rotary-piston engine 41.

An ignition device 37 and/or the fuel supply lines 36 are controlled to initiate the combustion. The line 56 serves to supply coolant for internal cooling of the engine. The heated working medium passes through the outlet opening 39 to the heat exchanger 57 and, after issuing its heat content, is discharged through the outlet 52 into the ambient air.

In this manner, or in a similar machine set not necessarily having but a single shaft, an approximation of the Ericsson process can be attained by heated expansion. The pressure and/or temperature drop, for example in the heat exchanger, may be compensated or even greatly overcompensated by controlling the supply of fuel or the supply of heat.

A particularly advantageous application according to FIG. 5 results when, according to the invention, the pulsatingly ignited rotary-piston engine 41 expands isothermally due to a correspondingly controlled supply of fuel. This is tantamount to a better realization of the Ericsson process than obtainable, for example, by the Ackeret-Keller method requiring a multiple-stage combustion. In conjunction with an internally cooled screw-type piston compressor 34, an approximation to the isothermal compression is made possible, and with the provision of the heat exchanger 57 there is afforded an isobaric heat exchange from the compressed cold working medium to the expanded hot medium. After starting the rotation with a sufficiently high temperature of the working medium or by employing corresponding fuels, the ignition devices can be inactivated in the event of self-ignition.

The degree of heat exchange of the presently known heat exchangers, being at most about 90%, has the consequence that the working medium does not attain the same temperature at the inlet opening 40 at as the outlet opening 39. For that reason, the combustion or the supply of fuel and/or the number, arrangement and size of the opening cross sections of the fuel supply lines 36 are to be so chosen, taking into account the reaction rate of the fuel employed, that after initiation of the ignition the temperature resulting in the heat exchanger is compensated and thereafter the desired isothermal expansion will occur.

The controlled heat supply required for a uniform thermal stress upon the active parts of the engine can be observed, for example, by providing temperature sensors or measuring gauges at these respective parts. Such sensors are also applicable for correctly adjusting the injection operation or for automatically controlling or regulating the fuel supply.

Relative to further modifications applicable to the present invention, such as for separately compressing and expanding engines, reference may be had to a survey by J. Krushchik "Die Gas-turbine," page 13, published by Springer-Verlag, Vienna, 1960.

Although the separate compression and expansion might appear to involve complications in comparison with reciprocating piston engines, it affords by the same token an extraordinary degree of freedom in other respects. Thus, any of the generally known and comparable processes, with the exception of the Stirling process, are applicable, including the Ericsson, Joule, Diesel, Otto and Carnot processes, as well as combinations of these processes.

Predicated upon the above-mentioned advantages of a screw-type machine in general, its design and use as a power generating engine according to the invention also involves the following advantages:

(1) Compression and expansion can be separately provided under optimal conditions. A good approximation to the Ericsson process is attainable.

(2) This type of engine does not involve dead spaces in the compressor nor in the engine portion. Hence a close approximation of the ideal internal combustion engine is attainable.

(3) The applicability of internal cooling in the displacement chambers, for example by liquids, has the significance that the evaporated coolant contributes to the generation of work. The cooling liquid improves the sealing and minimizes or obviates the wear of sealing structures.

(4) Low exhaust temperatures are attainable by optimal expansion conditions with suitable consideration of the properties of a two-substance mixture (steam and air of combustion).

(5) The engine affords using fuels other than those generally applicable.

To those skilled in the art it will be apparent from a study of this disclosure that my invention permits of various modifications and may be given embodiments other than those particularly illustrated and described herein, without departing from the essential features of the invention.

I claim:

1. A rotary-piston engine comprising a housing with an inner jacket surface in the shape of parallel cylinders which mutually overlap cross-sectionally, rotatable pistons of helical shape in meshing arrangement with each other and having parallel axes coincident with the respective axes of said cylinders, said pistons and said housing forming conjointly a group of displacement chambers varying with rotation of said pistons, inlet means for gaseous working medium and fuel communicating with said housing near one axial side thereof and comprising supply control means for maintaining a substantially isothermal operation of the engine, exhaust duct means communicating with said housing near the other axial side thereof, ignition means controllable from the outside to act through said housing to ignite the mixture within said respective displacement chambers, said respective displacement chambers having at the beginning of a rotation cycle an increasing volume communicating with said inlet means and being thereafter shut off from said inlet means when said ignition means are active, and said chambers being in communication with said exhaust duct means at the end of said cycle.

2. In an engine according to claim 1, said ignition means comprising an electric ignition circuit having an ignition point inside the space traversed by said displacement chambers.

3. In an engine according to claim 1, said inlet means comprising means for supplying solids-containing fuel.

4. An engine according to claim 1, comprising coolant supply means having coolant lines connected to said displacement chambers.

5. An engine according to claim 1, comprising a compressor interposed between said engine housing and said inlet means.

6. In an engine according to claim 5, said engine and said compressor forming a machine set together with each other, said compressor being rotary and having a shaft, and one of said engine rotary pistons having a shaft coaxially aligned and joined with the shaft of said compressor.

7. An engine according to claim 1, comprising a plurality of rotary compressors which form respective expansion stages and are joined with said engine to form a machinery set together therewith.

8. In an engine according to claim 7, said rotatable pistons having sections of mutually opposed helical pitch, and said housing having openings communicating with the respective displacement chambers in said sections and connecting them with said inlet means and exhaust duct means.

9. An engine according to claim 7, in which the working medium is a gas-vapor mixture and which comprises means for controlling the component shares of said mixture in dependence upon given operating conditions on at least one of the inlet and exhaust sides of the engine, whereby the resulting condensation of vapor produces sealant liquid and the liberated heat of condensation increases the work-generating capacity of the residual gas.

10. An engine according to claim 1, comprising a compressor connected to said inlet means, a heat exchanger connected between said engine and said compressor for heating the compressed working medium passing from said compressor to said engine by heat from the exhaust of said engine.

11. In an engine according to claim 1, said medium supply control means comprising heat sensor means responsive to the temperature of at least one of said rotors and housing, and fuel injection control means for controlling the fuel supply to obtain said substantially isothermal operation of the engine.

12. In an engine according to claim 1, said ignition means comprising laser radiators, and said housing having wall portions permeable to the laser radiation, said radiators having radiation beams directed through said respective wall portions to respective ignition points located in said chambers when said respective chambers are in shut-off positions.

References Cited

UNITED STATES PATENTS

| | | |
|---|---|---|
| 2,485,687 | 10/1949 | Bailey. |
| 2,578,196 | 12/1951 | Montelius. |
| 2,622,787 | 12/1952 | Nilsson. |
| 2,709,336 | 5/1955 | Nilsson et al. _____ 60—39.16 |
| 2,742,760 | 4/1956 | Hodge _____ 60—39.16 |
| 2,748,566 | 6/1956 | Fletcher _____ 60—39.16 |
| 2,808,813 | 10/1957 | Lindhagen et al. |
| 3,073,513 | 1/1963 | Bailey _____ 230—143 |
| 3,229,674 | 1/1966 | Muller _____ 123—855 |
| 3,405,604 | 10/1968 | Lysholm _____ 230—143 |

MARK M. NEWMAN, Primary Examiner

A. D. HERRMANN, Assistant Examiner

U.S. Cl. X.R.

123—8; 230—143; 91—84; 60—39.16